FIP8106 XR 3,590,249

[redacted]

X 340-146.3 ED X 5012C

X 5005D X 5000R

United State

[11] 3,590,249

[72] Inventor Melbourne
Saratoga, Calif.
[21] Appl. No. 764,473
[22] Filed Oct. 2, 1968
[45] Patented June 29, 1971
[73] Assignee International Business Machines Corporation
Armonk, N.Y.

[54] OPTICAL READ SYSTEM
8 Claims, 6 Drawing Figs.

[52] U.S. Cl. 250/199, 340/174.1, 350/151
[51] Int. Cl. H04b 9/00
[50] Field of Search 250/199, 200; 350/150, 151, 160, 161, 169, 269; 340/174, 174.1

References Cited

UNITED STATES PATENTS

| | | | |
|---|---|---|---|
| 3,394,360 | 7/1968 | Miyata | 340/174.1 |
| 3,491,351 | 1/1970 | Smaller et al. | 340/174.1 |
| 3,228,015 | 1/1966 | Miyata et al. | 350/151 |
| 3,302,028 | 1/1967 | Sterzer | 250/199 |
| 3,465,156 | 9/1969 | Peters | 250/199 |
| 3,421,002 | 1/1969 | Berger | 250/199 |

*Primary Examiner*—Robert L. Griffin
*Assistant Examiner*—Albert J. Mayer
*Attorneys*—Hanifin and Jancin and Gerald L. Moore

ABSTRACT: A read system for optically detecting data written on a memory element wherein a light beam is modulated by areas of the memory element and such modulation is detected for reading the data. The invention involves a parallel directed beam, not modulated by the data but utilized for subtracting background noise from the read beam.

Missing Markings 340-146.3 ?

INVENTOR.
MELBOURNE E. RABEDEAU
BY Gerald L Moore
ATTORNEY

OPTICAL READ SYSTEM

BACKGROUND OF THE INVENTION

1. Field of the Invention

This invention relates to a light beam system for reading information stored on a memory element and, more specifically, to means for reducing background noise in the light beam signal for increasing the efficiency of the system in reading the data.

2. Description of the Prior Art

In optical read systems for scanning memory elements to detect data written thereon, it is important to eliminate from the read signal as much of the background noise as possible since the modulation of the beam in response to the data is frequently quite small in comparison with the overall amplitude of the carrier beam. For instance, in reading memory materials known today by use of a magneto-optical effect, the rotation of the polarization of the beam may be less than 1°. It is easy to understand that any slight spurious modulation or rotation of the beam will overshadow the effects caused by the recorded data thereby making the reading of the data signal impossible.

There are primarily three sources of noise in a system of this type:

1. Noise in the light beam produced by the light-emitting component.
2. Noise produced by refraction and scattering of the light from small surface scratches and other imperfections in the memory element.
3. Shot effect and other detector noise.

It is a primary object of this invention to provide an optical read system incorporating means for reducing noise generated by refraction and scattering of the light from small imperfections in the memory and for reducing noise produced by the light-emitting source.

SUMMARY OF THE INVENTION

An optical read system incorporating a light beam comprised of two wavelength regions, one of which is modulated by the data recorded on a memory element being read and the second of which is relatively unaffected by the recorded data. After exposure to the memory element, the wavelength regions are split and differentially compared. Since the signal noise due to surface discontinuities of the memory material occurs in both beam regions, this noise is cancelled leaving relatively noise-free data signals to be detected. Additionally, embodiments of the invention are described showing methods of reducing noise due to unwanted beam modulation of both regions produced at the light-emitting source.

The foregoing and other features and the advantages of the invention will be apparent from the following more particular description of the preferred embodiments of the invention, as illustrated in the accompanying drawings.

DESCRIPTION OF THE INVENTIVE EMBODIMENTS

Figure 1:
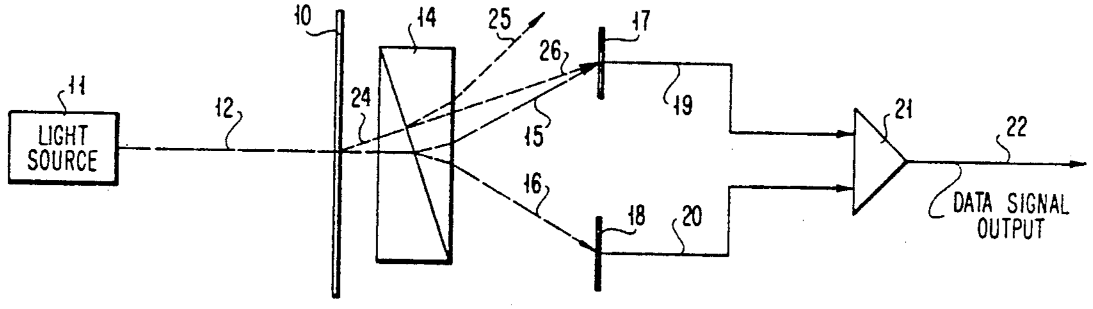
PRIOR ART FIG. 1
FIG. 1 is a pictorial and schematic illustration of a typical prior-art optical read system.

To explain the background of the invention, there is shown in FIG. 1 a prior-art optical read device for detecting data written on a memory element 10 and in which the subject invention can be used to advantage. The device comprises a light source 11 for generating a polarized light beam 12 which is passed through the memory element and is modulated by data written thereon. In this instance the modulations are rotations of the plane or polarization of the light beam by a magneto-optical effect produced by the magnetic alignment of the discrete areas of the memory element material, which rotation is indicative of the data recorded by the previous magnetic alignment of the areas of the element.

A Wollaston prism 14 is positioned to receive the beam after passage through the memory element for dividing the beam into two polarization components 15 and 16 with the light detectors 17 and 18 positioned respectively to receive the beams. The azimuth of the Wollaston prism is adjusted so that the two polarization components are very nearly equal when the plane of polarization of the input beam 12 is unrotated by the memory element. Hence, when the memory element is magnetized one component will become more intense while the other becomes less intense. Reversing the direction of magnetization in the memory element reverses the difference in intensity of the two polarization components of the light beam. An electrical signal indicative of the intensity of each light beam is fed through the conductors 19 and 20 to the differential amplifier 21 for the generation of a data output signal which is passed along the output conductor 22.

The split beam and differential amplifier circuitry is used to attempt a cancellation of any noise generated in the beam in the way of an unwanted modulation thereof which occurs equally in each beam. By differentially comparing the beams, the common mode noise will be subtracted from the data output signal, while the data signals, which are of opposite sign in the two channels, will add to form a larger signal. However, as shown by the dotted line 24 indicating a path that can be taken by a beam which is refracted by a discontinuity such as a scratch on the memory element, the beam is moved off path and subsequently split into the two beams 25 and 26 by the Wollaston prism. If such a refraction occurs, the lower half of the beam, which ordinarily should strike the detector 18, might be caused to strike the detector 17 while the upper beam component 25 misses both detectors. In this instance a noise pulse is generated by detector 17 that will not be subtracted by the differential amplifier circuitry and thus will appear in the data output signal. As shown, the prior art circuit will not subtract all noise of the beam but instead will only subtract that which occurs equally in the output of both detectors. The subject invention is presented to assist in solving this problem.

In accordance with the present invention the read beam consists of two wavelength regions with one being modulated by the data recorded on the memory element and the other being relatively unaffected by that recorded data. After exposure to the memory element, the two wavelength regions are separated and thereafter differentially compared to subtract out the noise produced by refraction and scattering in the memory element. Since only one wavelength region is modulated by the data, there is no subtraction of the data signal. Any noise derived from refractive errors in the memory element which misdirects the light will appear in approximately equal magnitudes in both beam regions. This is shown schematically in FIG. 2 and more explicitly in FIG. 3. As shown in FIG. 3, the refracted, scattered, or birefringed portion of the beam M+U is denoted as beam R, which is first split into modulated and unmodulated portions by dichroic beam splitter 41. The resulting beams are then further split, as shown, into polarization components by the prisms 42 and 44 and at least one beam from each of the resulting pairs of split beams impinges on photodetector 51 or 52 and 45 or 46 respectively. Likewise, noise derived from stress-induced birefringence of low magnitude will also appear in both beams. Thus, by differentially comparing the beams such noise will be subtracted from the data signal.

Figure 2:
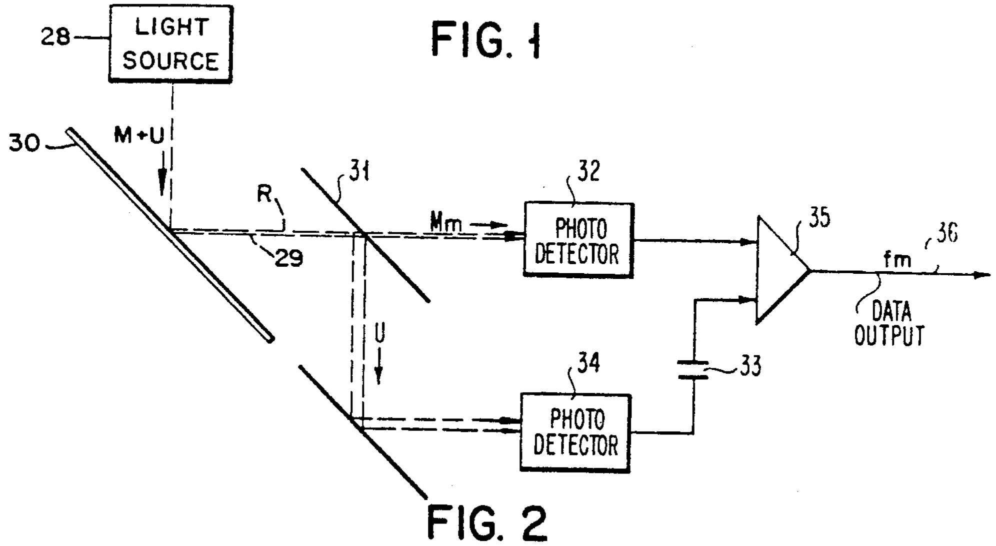
FIG. 2 is a similar view of a preferred embodiment of the subject invention utilizing a reflective reading technique.
Figure 3:
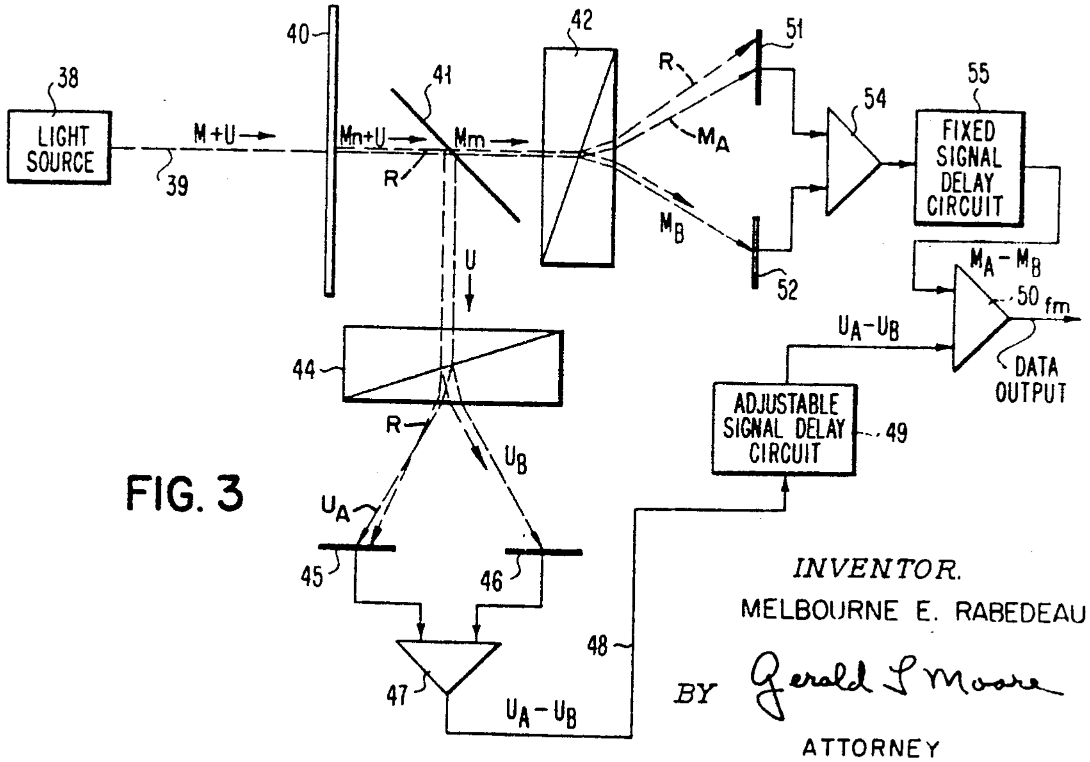
FIG. 3 is a schematic illustration of a second embodiment of the invention.

One embodiment of the invention shown in FIG. 2 utilizes a light source 28 which emits a beam 29 having wavelengths in the M and U regions. The light is exposed to the memory element or film 30 by passage therethrough with the M light region being modulated by data recorded thereon by one of the several magneto-optical principles and the U light region being relatively unmodulated. Thereafter the beam is passed through a dichroic beam splitter 31 for separating the M and U regions with the M region now being designated as $M_m$ corresponding to the modulated beam. Photodetectors 32 and 34 are used to detect the beam and generate a signal responsive thereto which is fed to a differential amplifier 35 for comparison of the signals. Since it is desirable to transmit only the noise signals of the U beam to the differential amplifier, capacitor 33 is placed in the circuit to block the DC level from appearing at the input to the differential amplifier. A signal $f_m$ then is transmitted through conductor 36 responsive to the modulation of the beam region M. It should be realized that a similar system could be utilized with equal success where the beam M+U is reflected by the element 30 instead of being transmitted therethrough for reading the data as would be done in reading the data by detecting the Kerr effect on the beam as shown in FIG. 2.

In FIG. 3 is illustrated a second embodiment of the invention comprising a light source 38 suitable to generate a light beam 39 comprised of wavelength regions M and U. The beam is passed through a memory element 40 with the region M being modulated to become $M_m$. A dichroic beam splitter 41 separates the two regions such that the region $M_m$ strikes a Wollaston prism 42 and the region U strikes the Wollaston prism 44. The prism 44 divides the beam U into polarization components $U_a$ and $U_b$ which strike light detectors 45 and 46, respectively, for the generation of electric signals which are fed to the differential amplifier 47. The resultant differential signal is fed through the conductor 48 and an adjustable signal delay circuit 49 to a differential amplifier 50.

The beam region $M_m$ is split into polarization components $M_a$ and $M_b$ which strike the light detectors 51 and 52, respectively. The resultant signals from these detectors are differentially compared in the amplifier 54 to generate a differential signal which is fed through the fixed signal delay circuit 55 to the differential amplifier 50.

Thus, each beam is split into polarization components and differentially compared to eliminate any modulation therein which originates at the source 38 or occurs only in that beam region. Such modulation might occur both in the light source and in the path taken by the beam prior to reaching the Wollaston prisms intersecting that beam region. By comparing the components of each beam, the common mode noise is eliminated for the generation of a differential signal responsive to each beam, which signal, in turn, is compared at the differential amplifier 50. The beam region $M_m$ is modulated by the data and the beam region U is not because of the particular characteristics of the memory element and the specific wavelengths chosen. This phenomenon is shown and described in a 1967 article by C. D. Mee, entitled "Recent Measurements of Magneto-Optic Properties of Garnets" which appears in *Contemporary Physics*, Vol. 8, p. 385. In particular materials and europium oxides exhibit variations in the strength of the magneto-optic effects which are dependent upon the wavelength of the light beam used. This general property of "susceptibility" is described in a 1967 article by P. S. Pershan in *The Journal of Applied Physics*, Vol. 38, p. 1482. As a result, when the regions $M_m$ and U are compared there results a data output signal which is a function of m (the modulation of the beam caused by the data recorded on the memory element) with substantially all of the background noise being deleted by the circuit heretofore described.

Figure 4:
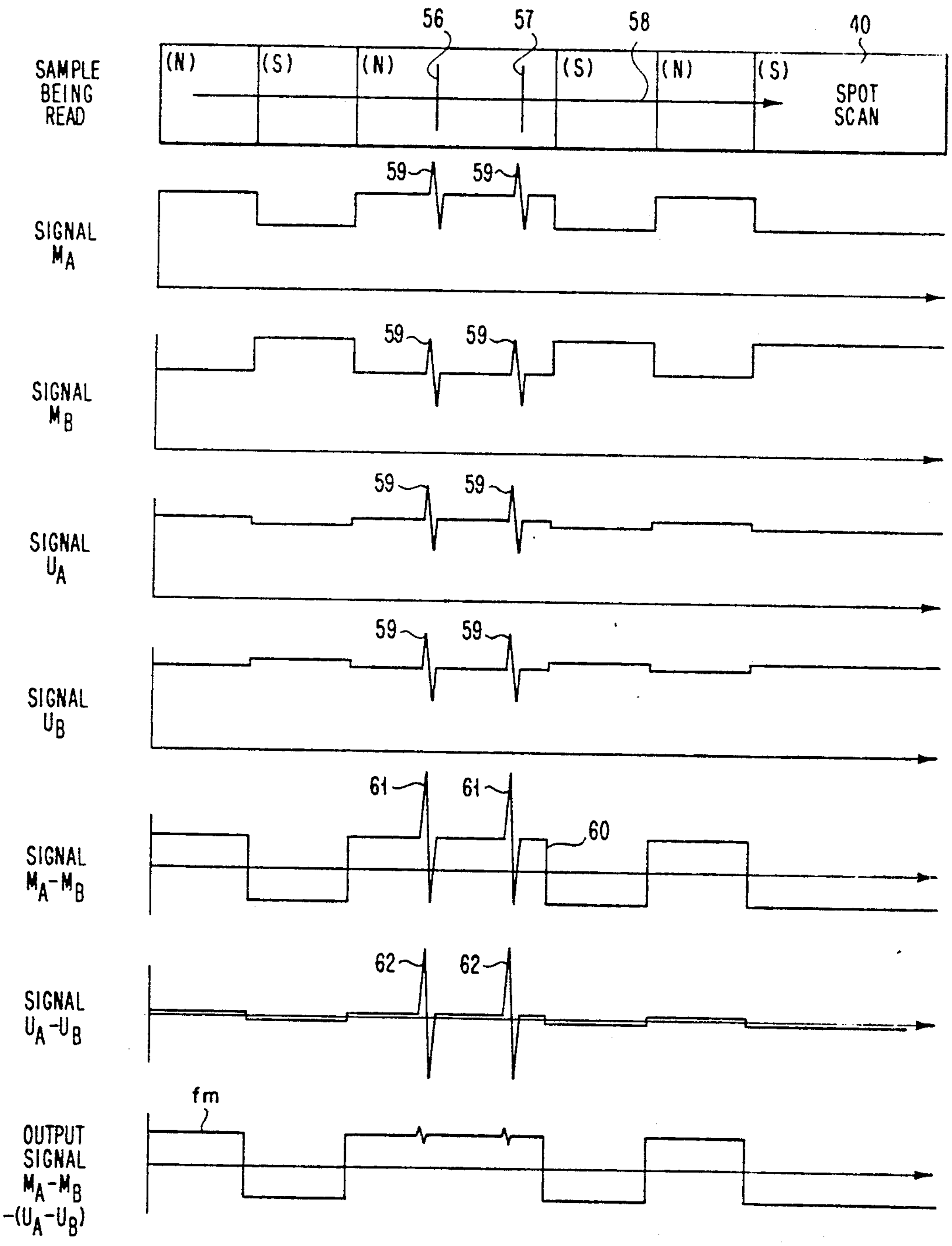
FIG. 4 illustrates the various signals generated in the FIG. 3 invention embodiment.

To illustrate the operation of the circuit heretofore described, FIG. 4 shows the signal waveforms generated in the circuit of FIG. 3 including the signal noise resulting as a result of the scratches 56 and 57 on the memory element 40. These scratches are indicative of the deformities in the element that intersect the beam as it is moved along the line 58 to read the data recorded. Such deformities serve to superimpose noise on the read signal. It will be noted that the signals $M_a$, $M_b$, $U_a$, and $U_b$ are each modulated at the respective points 59 by scratches of the type described on the memory element. When the signals $M_a$ and $M_b$ are differentially compared, there results the signal 60 in which the data modulation is enhanced and also there exists the enhanced signal 61 corresponding to the noise interjected by the scratches on the memory element. The scratches modulate the region U by refracting and spreading that portion of the beam also. At the same time, the signals $U_a$ and $U_b$ are differentially compared to substantially delete any light source noise. The differential comparison, however, also results in an enhancement of the noise caused by the scratches indicated by the areas 62. However, a subsequent differential comparison with the signal 60 in the amplifier 50 substantially deletes any scratch noise from the ultimate output signal $f_m$ to render a more readable and usable output signal.

Figure 5:
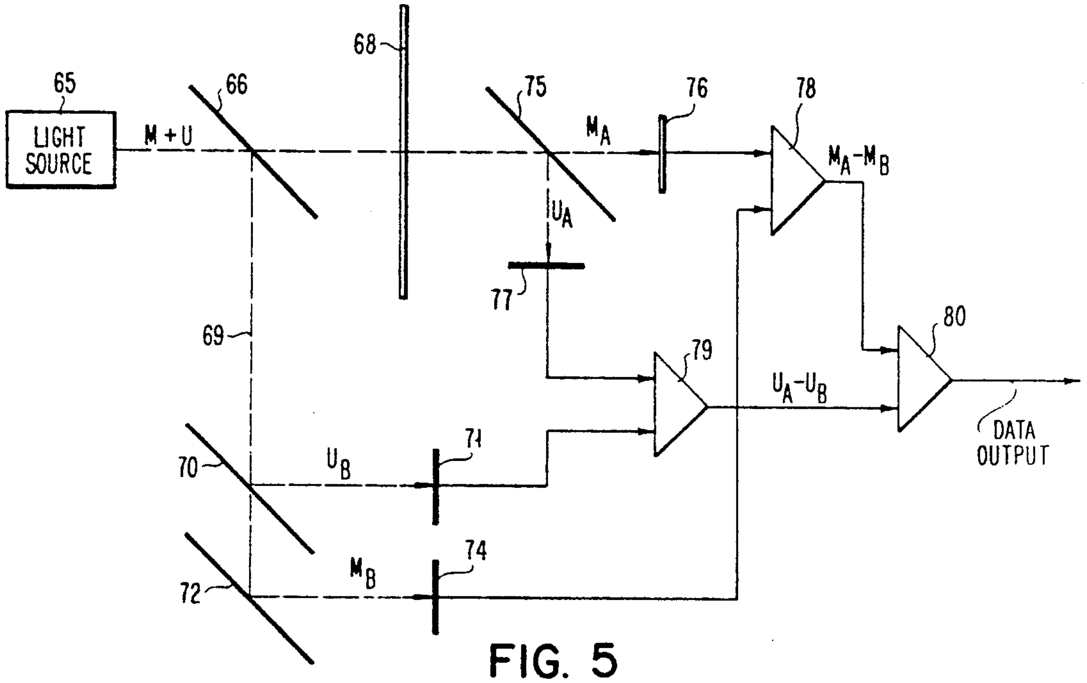
FIGS. 5 and 6 are schematic illustrations of other embodiments of the invention.

In FIG. 5 is shown still another embodiment of the invention in which the light is generated at the source 65 consisting of regions M and U as previously described. In this embodiment, however, the beam first is passed through a beam splitter 66 before being passed through the memory element 68, which in this instance is comprised of material that selectively absorbs the M wavelength region while not absorbing the U wavelength region. Thus, this system will function to read a memory element in which the material is absorbent of the selected wavelength region. The same problems exist with the existence of spurious noises in the data signal.

To eliminate the spurious noises in such a system, the beam 69 is directed onto a dichroic beam splitter 70 serving to deflect the region $U_b$ onto a light detector 71. Concurrently the region $M_b$ passing through the splitter strikes a mirror 72 and is directed onto a detector 74. The beam portion passed through the memory element strikes a dichroic beam splitter 75 and is split into regions $M_a$ and $U_a$ which are directed onto detectors 76 and 77 respectively. To eliminate the noise in each beam region, the detector signals responsive to each beam region M and U now are compared at the differential amplifiers 78 and 79 respectively to render noise free signals. Finally, the output signal is generated by comparing these noise free signals in the differential amplifier 80 to obtain a data output signal.

Figure 6:
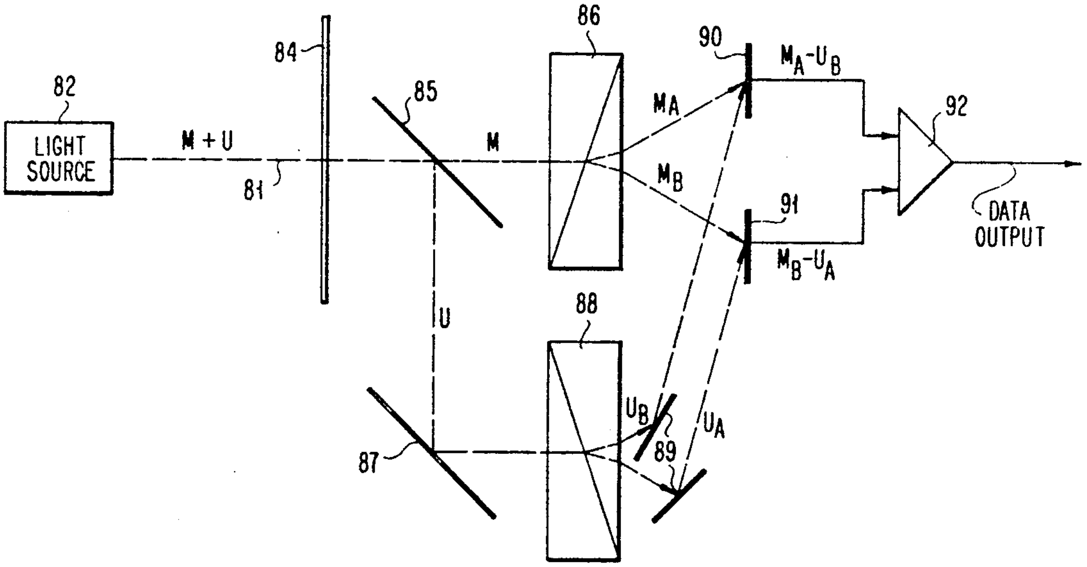

In FIG. 6 is shown still another embodiment of the invention in which the beams are compared optically instead of electrically to eliminate noise therein. The beam 81 from the light source 82 contains regions M and U with the M region only being affected by data recorded on the memory element 84. After passage through the element, the beams are split by a dichroic beam splitter 85 into the regions M and U. Region M is passed through a Wollaston prism 86 and split into the two polarization components $M_a$ and $M_b$ to detect the intensity thereof for reading the data on the element in the same manner as in FIG. 3.

To eliminate noise in each of these data signals to be compared, the region U, after being reflected by the mirror 87, is split into regions $U_a$ and $U_b$ by use of a Wollaston prism 88 in the same manner as region M. These regions are now reflected by mirrors 89 onto detectors 90 and 91 receiving the corresponding components of region M. Since the $M_a$ and $U_b$ beams illuminate the same detector 90, they produce a signal $M_a+U_b$ and since the $M_b$ and $U_a$ beams illuminate the same detector 91, they produce a signal $M_b+U_a$. These two beams are compared in the differential amplifier 92, thus giving an output signal $M_a+U_b-(M_b+U_a)=M_a-M_b-(U_a-U_b)$ which is the same signal obtained from the system shown in FIG. 3. Thus, the beam regions are compared partially by optical means rather than totally by electrical means as in the previous embodiments.

While the invention has been particularly shown and described with reference to preferred embodiments thereof, it will be understood by those skilled in the art that various changes in the form and details may be made therein without departing from the spirit and scope of the invention.

What I claim is:

1. Apparatus for optically detecting markings of a magnetically marked element which markings are capable of modulating certain wavelengths in the spectrum of light, and for reducing spurious modulations present in an output signal which are produced by scratches, discontinuities and stresses in the magnetically marked element and by variations in the light source, comprising:

a source for generating a beam of light having at least two wavelengths within separate regions of the spectrum, said beam impinging upon a magnetically marked element to detect the markings thereof, only one of said wavelength regions of light being modulated by said markings of said magnetically marked element, the other of said wavelength regions being unmodulated by said markings of said element, but both of said wavelength regions being modulated by the scratches, discontinuities and stresses present in said magnetically marked element and by variations in said source of light;

means for separating that modulated region which is modulated by the magnetic markings upon said marked element from said wavelength region which remains unmodulated by said magnetic markings, said means being positioned to receive said beam of light after it has impinged upon said magnetically marked element; and means responsive to said separated beams for separately detecting and differentially comparing said beams, whereby the modulations produced by the scratches, discontinuities and stresses in said magnetically marked element and by variations in said light source are reduced to provide an improved output signal.

2. The apparatus combination as defined in claim 1 wherein said light beam is passed through said element for reading the markings thereon.

3. The apparatus combination as defined in claim 1 wherein said light beam is reflected from said element for reading the markings thereon.

4. The apparatus combination as defined in claim 1 wherein said light beam regions are separated by a dichroic mirror after being received from said element.

5. The apparatus combination as defined in claim 1 wherein said light beam regions are separated after the beam is received from said element with one region thereafter being phase adjusted before being differentially compared.

6. The apparatus combination as defined in claim 1 wherein both wavelength regions are exposed to the element prior to being differentially compared.

7. The apparatus combination as defined in claim 1 wherein said wavelength regions are compared by generating an electrical signal responsive to each and comparing said electrical signals.

8. The apparatus combination as defined in claim 1 wherein said wavelength regions are added by optical means then differentially compared to detect the modulation of the beam.